United States Patent
Vora et al.

(10) Patent No.: US 11,237,269 B2
(45) Date of Patent: Feb. 1, 2022

(54) LOCALIZATION TECHNIQUE

(71) Applicant: Ford Global Technologies, LLC, Dearborn, MI (US)

(72) Inventors: Ankit Girish Vora, Dearborn, MI (US); Siddharth Agarwal, Dearborn, MI (US); Jakob Nikolaus Hoellerbauer, Canton, MI (US); Peng-Yu Chen, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 622 days.

(21) Appl. No.: 15/963,383

(22) Filed: Apr. 26, 2018

(65) Prior Publication Data

US 2019/0331497 A1    Oct. 31, 2019

(51) Int. Cl.
| | | |
|---|---|---|
| *G01S 17/89* | (2020.01) | |
| *G01C 21/28* | (2006.01) | |
| *G06T 7/73* | (2017.01) | |
| *G06F 16/29* | (2019.01) | |
| *G06F 16/9537* | (2019.01) | |
| *G06F 16/2457* | (2019.01) | |

(52) U.S. Cl.
CPC ............... *G01S 17/89* (2013.01); *G01C 21/28* (2013.01); *G06F 16/24578* (2019.01); *G06F 16/29* (2019.01); *G06F 16/9537* (2019.01); *G06T 7/74* (2017.01)

(58) Field of Classification Search
CPC ............... G06F 16/9537; G06F 16/29; G06F 16/24578; G06T 7/74; G06T 2207/30244; G06T 2207/10028; G06T 2207/30252; G01C 21/28; G01S 7/4808; G01S 17/89; G01S 17/86
See application file for complete search history.

(56) References Cited

U.S. PATENT DOCUMENTS

| | | | |
|---|---|---|---|
| 9,194,949 B2 | 11/2015 | Becker et al. | |
| 9,863,775 B2 | 1/2018 | Kojo | |
| 10,108,867 B1* | 10/2018 | Vallespi-Gonzalez | ............ G01S 17/86 |
| 2005/0246078 A1 | 11/2005 | Vercammen | |
| 2009/0228204 A1* | 9/2009 | Zavoli | ............ G01S 19/48 |
| | | | 701/532 |
| 2013/0182075 A1* | 7/2013 | Clifton | ............ G01S 17/86 |
| | | | 348/46 |
| 2017/0075355 A1 | 3/2017 | Micks et al. | |
| 2018/0268566 A1* | 9/2018 | Houts | ............ G01S 17/89 |

(Continued)

FOREIGN PATENT DOCUMENTS

| | | |
|---|---|---|
| CN | 105573320 A | 5/2016 |
| DE | 102016009117 A1 | 2/2017 |

OTHER PUBLICATIONS

Translation of Florian, DE 102016009117, 2017 (Year: 2017).*

(Continued)

*Primary Examiner* — Yoshihisa Ishizuka
(74) *Attorney, Agent, or Firm* — Frank A. MacKenzie; Bejin Bieneman PLC

(57) ABSTRACT

A system includes a processor and a memory. The memory stores instructions executable by the processor to generate, from LIDAR data, a first intensity map of an area around a vehicle, and to estimate a vehicle location based on comparing the first intensity map to a grayscale top view image.

20 Claims, 6 Drawing Sheets

(56) References Cited

U.S. PATENT DOCUMENTS

2019/0033459 A1* 1/2019 Tisdale .................. G01S 17/89

OTHER PUBLICATIONS

Chu, et al., "Accurate Vision-Based Vehible Localization Using Satellite Imagery", Toyota Technological Institute at Chicago, Chicago, IL , downloaded from Internet URL: https://arxiv.org/pdf/1510.09171.pdf, Oct. 30, 2015 (9 pages).

* cited by examiner

LOCALIZATION TECHNIQUE

BACKGROUND

A vehicle such as an autonomous or semi-autonomous vehicle can use data from a LIDAR (Light Imaging Detection And Ranging) sensor to aid navigation. LIDAR sensors can be used to generate point cloud data, i.e., a collection of data describing points in three dimensions. Further, an autonomous vehicle may compare its substantially real-time LIDAR point-cloud data to a digital map of an area in which the vehicle is operating for locating the vehicle within the area and navigating the vehicle based on the determined vehicle location. Digital maps typically include road data, intersections, number of lanes in a road, building locations, etc. Creating the digital maps used for vehicle navigation is typically slow and/or consumes significant computing resources. A vehicle may navigate within an area for which no digital map is available.

DETAILED DESCRIPTION

Introduction

Figure 1:
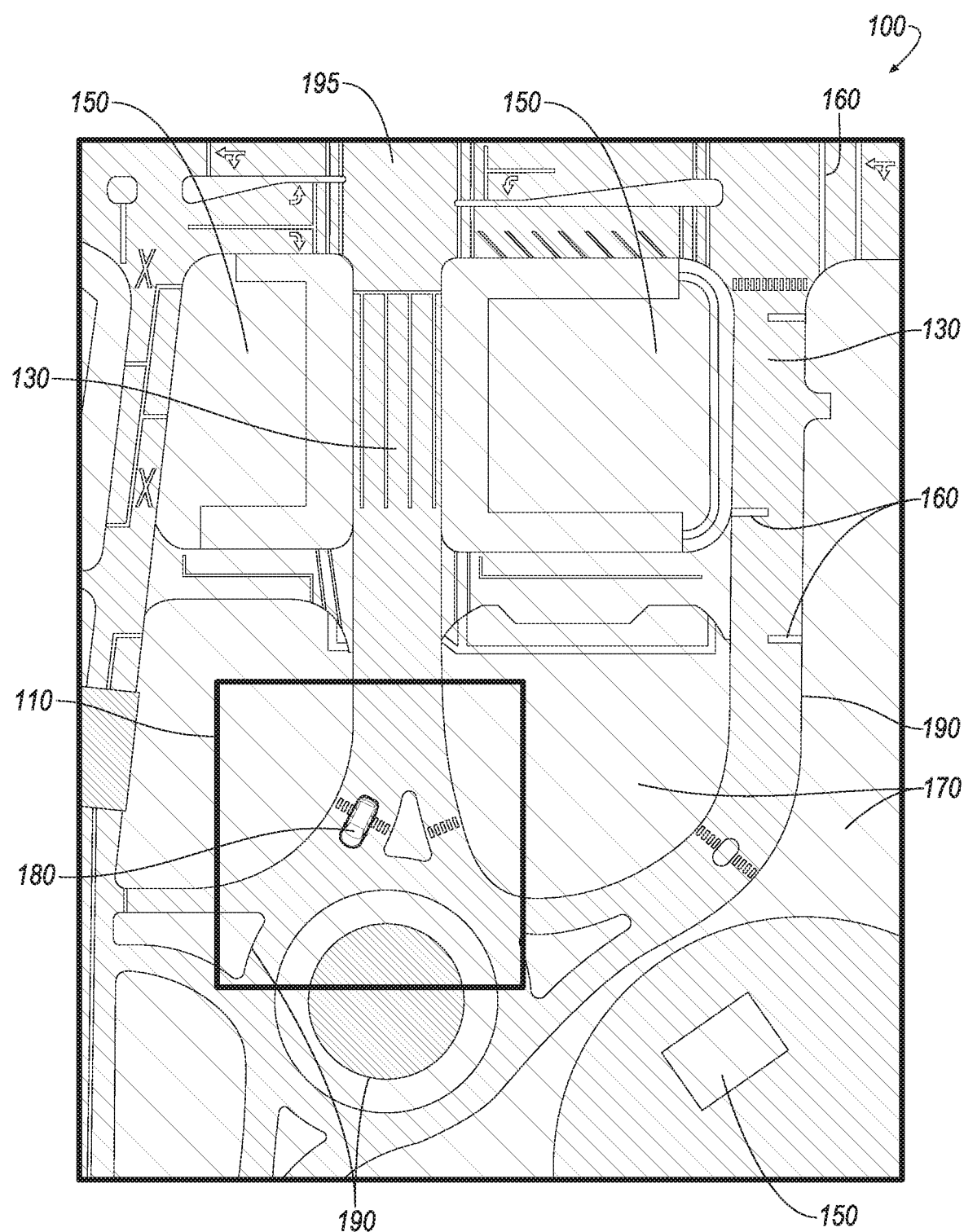
FIG. 1 is a block diagram showing a grayscale image of an exemplary area.

Disclosed herein is a system including a processor and a memory. The memory stores instructions executable by the processor to generate, from LIDAR data, a first intensity map of an area around a vehicle, and to estimate a vehicle location based on comparing the first intensity map to a grayscale top view image.

The instructions may include further instructions to generate a second intensity map based on the grayscale image, and to estimate the vehicle location based at least in part on the second intensity map.

The instructions to compare the first intensity map to the grayscale image may include further instructions to identify a best match region of the grayscale image, by comparing each of a plurality of regions of the second intensity map to the first intensity map.

The instructions may include further instructions to estimate, based on the identified best match section, the vehicle location and a vehicle heading.

The instructions to estimate the vehicle heading may include further instructions to generate a plurality of rotated first intensity maps by rotating the first intensity map in a left and a right direction compared to a last vehicle heading and determine the best match based on comparing the rotated first intensity maps to the second intensity map.

The instructions to estimate the vehicle location may include further instructions to determine the plurality of sections based on a last identified vehicle location, to estimate a score of each section by comparing the respective section to the first intensity map, and to identify the best match section by selecting the section with a maximum score.

The instructions may include further instructions to estimate the vehicle location based on a last estimated vehicle location, one or more physical attributes of the vehicle including at least one of a vehicle speed and a vehicle heading, and an identified matched section of the second intensity map.

The instructions may include further instructions to estimate a first vehicle heading based on the first intensity map and the best matched section of the second intensity map, and to estimate the vehicle heading based at least in part on the first vehicle heading and the one or more physical attributes of the vehicle.

Further disclosed herein is a method including generating, from LIDAR data, a first intensity map of an area around a vehicle, and estimating a vehicle location based on comparing the first intensity map to a grayscale top view image.

The method may further include generating a second intensity map based on the grayscale image, and estimating the vehicle location based at least in part on the second intensity map.

Comparing the first intensity map to the grayscale image may further include identifying a best match region of the grayscale image, by comparing each of a plurality of regions of the second intensity map to the first intensity map.

The method may further include estimating, based on the identified best match section, the vehicle location and a vehicle heading.

Estimating the vehicle heading may further include generating a plurality of rotated first intensity maps by rotating the first intensity map in a left and a right direction compared to a last vehicle heading, and determining the best match based on comparing the rotated first intensity maps to the second intensity map.

Estimating the vehicle location may further include determining the plurality of sections based on a last identified vehicle location, estimating a score of each section by comparing the respective section to the first intensity map, and identifying the best match section by selecting the section with a maximum score.

The method may further include estimating a first vehicle heading based on the first intensity map and the best matched section of the second intensity map, and estimating the vehicle heading based at least in part on the first vehicle heading and the one or more physical attributes of the vehicle.

The method may further include estimating the vehicle location based on a last estimated vehicle location, one or more physical attributes of the vehicle including at least one of a vehicle speed and a vehicle heading, and an identified matched section of the second intensity map.

Further disclosed is a computing device programmed to execute any of the above method steps.

Yet further disclosed is a computer program product, comprising a computer readable medium storing instructions executable by a computer processor, to execute any of the above method steps.

System Elements

Navigation of a land vehicle may be based on three-dimensional (3D) map data of an area in which the vehicle is operating. A vehicle computer may generate, from LIDAR data, a first intensity map of an area around a vehicle and may estimate a vehicle location based on comparing the first intensity map to a grayscale satellite image. Typically, vehicle computers estimate vehicle location based on generated high definition (HD) maps. Generating such HD maps is typically very time-consuming and expensive in terms of computer processing resources. Thus, advantageously, the present system improves computer processing and efficiency by estimating the vehicle location without incurring the requirements to generate high definition (HD) maps.

FIG. 1 illustrates a vehicle 180 driving in an example geographical area 100. FIG. 1 is a top view image of the area 100, e.g., a representation of an image captured by a camera above the ground. To capture an aerial or top-view image of an area 100, a camera may be mounted to a satellite, aircraft, helicopter, unmanned aerial vehicles (or drones), balloon, stand-alone pole, a ceiling of a building, etc. A geographic area 100 (or simply area 100) in the context of this disclosure means a two-dimensional area on the surface of the earth. Boundaries or edges of an area may be defined by global positioning system (GPS) coordinates, e.g., as vertices of a triangular or rectangular area 100, a center of a circular area 100, etc. An area 100 may have any dimensions and/or shape, e.g., rectangular, oval, circular, non-geometrical shape, etc. For example, an area 100 may include a neighborhood, a town, an airport, etc.

An area 100 may include features. In the present context, a "feature" of an area 100 means includes physical characteristic or structure of the area 100, such as edges (e.g., a road boundary 190, a metal guard boundary 190, etc.) on a ground surface, a shape (e.g., of a structure 170), a gradient (or slope), a pattern (e.g., of a roundabout), a building 150, a bridge, a traffic light, a delineator, and a raised pavement marker 160. A road 130 can be any type of dirt road 130 or paved road 130, e.g., covered by concrete, asphalt, tar, etc. A road 130 may have one or more lanes. A road 130 may be one-way or two-way. A roundabout may have a circular or oval shape. An intersection 195 may be a location where two or more roads intersect. A road marker 160 may be a raised and/or flush pavement marker formed of metal, plastic, etc., that is mounted to and/or embedded in a road 130 surface, and/or a painted marking on the road 130 surface. A boundary (or edge) of a road 130 is a set of points defining location where a road 130 surface material, e.g., asphalt, ends. In the present context, the boundary 190 may additionally or alternatively include one or more physical roadway features such as a traffic barrier including metal guardrail boundaries 190, one or more road markers 160 such as a painted line or lines, etc. An area 100 may include any type of structures 170 such as traffic sign(s), bridge(s), etc. and/or vegetation(s), hill(s), mountain(s), etc.

FIG. 1 shows an example zone 110. A zone 110 in this context is a portion of a geographical area 100 defined by a current location of the vehicle 180, e.g., a rectangular shaped area centered at the vehicle 180 location. Thus, a zone 110 moves as the vehicle 180 moves. The zone 110 may have fixed dimensions, e.g., 100×100 meter, and a rectangular, circular, and/or an irregular shape, etc. Respective zone 110 dimensions or boundaries may be defined based on a field of view of vehicle 180 sensors 230, as discussed below with reference to FIGS. 3-4. In the present context, an area 100 may be a neighborhood, etc., whereas a zone 110 is a portion of the area 100 surrounding the vehicle 180 and substantially within a field of view of the vehicle 180 sensors 230, as discussed with reference to FIGS. 3-4.

A map of an area 100 includes location coordinates such as global positioning system (GPS) coordinates of points within the area 100, e.g., points that define map features such as roads 130, intersections, etc. An image, such as an aerial image of the area 100, in the present context, is a digital image including a plurality of pixels (or points) and data related to each of the pixels, e.g., color, intensity, etc. An image may be a "captured" image, i.e., captured by a camera or other optical sensor such as a vehicle camera, a satellite camera, etc., and/or may include "generated" image data, i.e., data generated from stored information such as map data, e.g., an intensity map, as discussed below.

Figure 2:
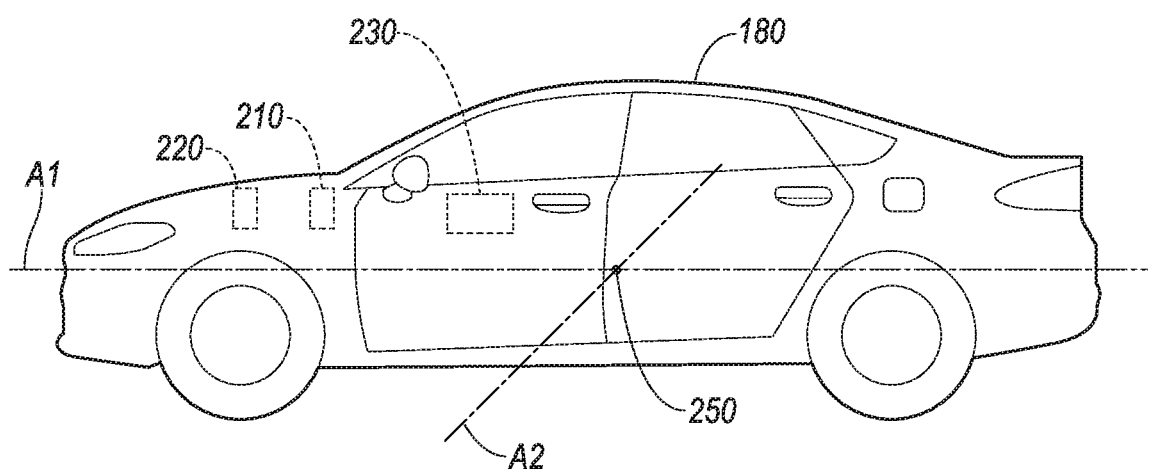
FIG. 2 shows an example vehicle.

Referring now to FIG. 2, an example vehicle 180 may include a computer 210, actuator(s) 220, sensors 230 such as a (Light Detection and Ranging) LIDAR sensor 230, GPS sensor 230, etc., and other components such as discussed herein below. A vehicle 180 may be powered in variety of ways, e.g., including with an electric motor and/or internal combustion engine. A vehicle 180 may include a reference point 250, e.g., an intersection of a vehicle 180 longitudinal and lateral axes A1, A2. In the present context, a vehicle 180 location refers to location coordinates of the vehicle 180 reference point 250. In the present context, the vehicle 180 has an actual location that is to be determined by the computer 210. The computer 210 may determine the vehicle 180 location based on vehicle 180 sensor 230 data such as data received from a vehicle 180 location sensor 230, or may estimate the location based on image data as described below.

The computer 210 includes a processor and a memory. The memory includes one or more forms of computer-readable media, and stores instructions executable by the computer 210 for performing various operations, including as disclosed herein.

The computer 210 may operate the vehicle 180 in an autonomous, semi-autonomous, or non-autonomous mode. For purposes of this disclosure, an autonomous mode is defined as one in which each of vehicle 180 propulsion, braking, and steering are controlled by the computer 210; in a semi-autonomous mode the computer 210 controls one or two of vehicle 180 propulsion, braking, and steering; in a non-autonomous mode, a human operator controls vehicle propulsion, braking, and steering.

The computer 210 may include programming to operate one or more of vehicle brakes, propulsion (e.g., control of acceleration in the vehicle 180 by controlling one or more of an internal combustion engine, electric motor, hybrid engine, etc.), steering, climate control, interior and/or exterior lights, etc., as well as to determine whether and when the computer 210, as opposed to a human operator, is to control such operations.

The computer 210 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 210 is generally arranged for communications on a vehicle communication network such as a bus in the vehicle such as a controller area network (CAN) or the like.

Via the vehicle network, the computer 210 may transmit messages to various devices in the vehicle 180 and/or receive messages from the various devices, e.g., the LIDAR sensor 230, actuators 220, etc. Alternatively or additionally, in cases where the computer 210 actually comprises multiple devices, the vehicle communication network may be used for communications between devices represented as the computer 210 in this disclosure. Further, as mentioned below, various controllers and/or sensors 230 may provide data to the computer 210 via the vehicle 180 communication network.

The vehicle 180 actuators 220 may be implemented via circuits, chips, or other electronic components that can actuate various vehicle subsystems in accordance with appropriate control signals as is known. The actuators 220 may be used to control braking, acceleration, and steering of the vehicle 180. As an example, the vehicle 180 computer 210 may output control instructions to control the actuators 220.

The vehicle 180 may include one or more LIDAR sensor(s) 230, providing data encompassing at least some of an exterior of the vehicle 180. The LIDAR sensor 230 may include a processor that is programmed to transmit LIDAR data via the vehicle 180 network. The LIDAR data may be received by the vehicle 180 computer 210 from LIDAR sensors 230 in a conventional manner, e.g., via a vehicle 180 network whereby the LIDAR data can be stored in a memory of the computer 210. The LIDAR data may include coordinates, e.g., according to a 3-dimensional cartesian coordinate system. LIDAR data may further include other data pertaining to other objects such as size, relative speed to the host vehicle 180, etc. In one example shown in FIG. 2, a LIDAR sensor 230 may sweep an area 100 in the LIDAR sensor 230 field of view, e.g., an area 100 around the vehicle 180, by transmitting laser beams, and receive reflections of the transmitted LIDAR beams. The LIDAR sensor 230 sweeps an area around the vehicle 180 with light beams and receives reflections of the broadcasted light beams from outer surfaces of the features such as structures 170, etc., and/or road 130 surface. Thus, the LIDAR data may include location coordinates of points on outer surfaces of features which cause a reflection of the emitted light beams. In other words, the LIDAR sensor 230 data may include 3D location coordinates of a plurality of points within the field of view of the LIDAR sensor 230.

In addition, the computer 210 may be programmed to communicate through a wireless communication network with, e.g., a remote computer. The wireless communication network, which may include a Vehicle-to-Vehicle (V-to-V) and/or a Vehicle-to-Infrastructure (V-to-I) communication network, includes one or more structures by which the vehicles 180, the remote computer, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services.

Vehicle 180 navigation may be based on grayscale images of an area 100 in which the vehicle 180 is operating. A vehicle 180 computer 210 may use the grayscale image of the area 100 to determine a vehicle 180 location and/or to navigate the vehicle 180 within the area 100, as discussed below.

Figure 3:
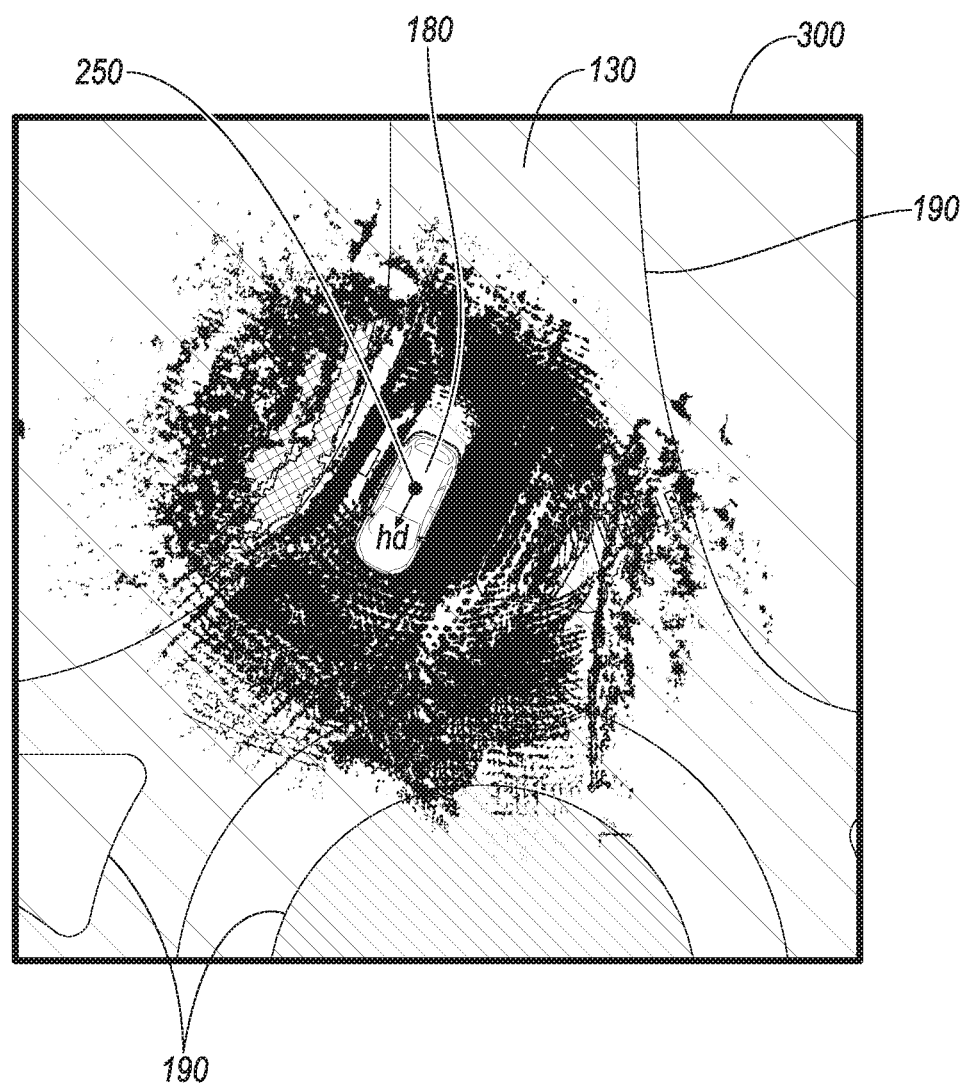
FIG. 3 shows a first intensity map of a zone around the vehicle of FIG. 1.

FIG. 3 illustrates an example intensity map 300 including at least a portion of a zone 110 of an area 100. The vehicle 180 computer 210 may be programmed to generate the intensity map 300 based on data received from the vehicle 180 LIDAR sensor 230. An intensity map 300, as shown in FIG. 3, is a map representing an area 100 in a two-dimensional (2D) plane. The intensity map 300 includes multiple cells, e.g., forming a grid of same size cells, and includes an average intensity for each cell of the map. A cell of the intensity map 300 represents a portion of the ground surface. In one example, dimensions of cells may be associated with a 10×10 centimeter (cm) square on the ground surface. An "intensity" of a cell may be specified by a numeric value, e.g., in percentage, representing a physical measurement of a brightness of an area encompassed by the respective cell. In one example, an intensity of 0 (zero) % specifies a dark point and an intensity of 100% is a bright cell on the intensity map 300. Additionally, an intensity map 300 may include a standard deviation value for each cell of the map. The intensity map (or the first intensity map) 300 may include an area that is substantially same as a detection range, e.g., 30 meters (m), of the vehicle 180 LIDAR sensor 230, e.g., a rectangular, circular, etc.-shaped area around the vehicle 180. As discussed above, the computer 210 may receive 3D data from the LIDAR sensor 230. Thus, the computer 210 may be programmed to generate the 2D intensity map 300 based on the received 3D LIDAR sensor 230 data. For example, the computer 210 may be programmed to generate the 2D intensity map 300 based on LIDAR sensor 230 point cloud data for a ground surface and/or any point substantially near the ground surface, e.g., within 30 cm of the ground surface. Thus, the intensity map 300 can be compared to a 2D intensity map 400 generated from the top view image of an area 100, as discussed below.

Figure 4:
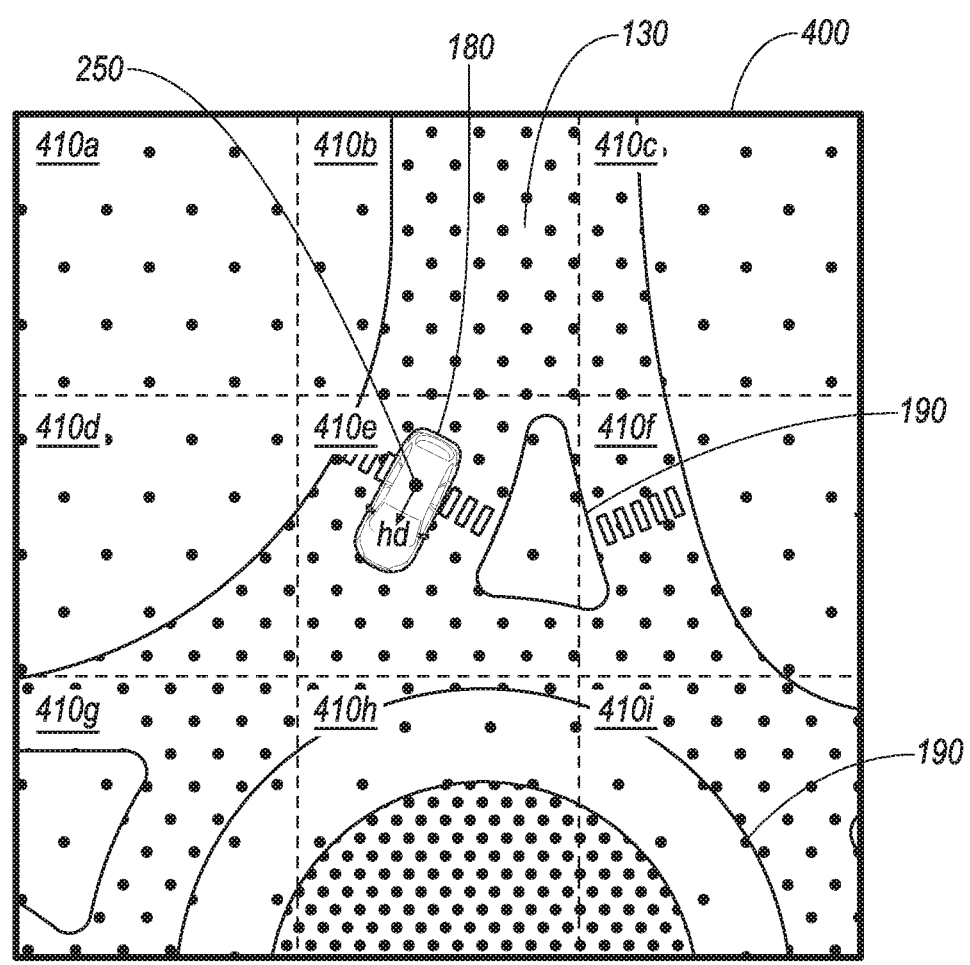
FIG. 4 shows a second intensity map of the area.

With reference to FIG. 4, the computer 210 may be programmed to generate an intensity map 400 based on the received grayscale image of an area 100. The computer 210 may be programmed to generate the intensity map 400 by applying an image filter to the grayscale image. In one example, the computer 210 calculates an intensity value and/or standard deviation for each pixel of the grayscale image. In another example, the computer 210 may receive a color image of the area 100. Thus, the computer 210 may be programmed to generate an intensity map 400 from the received color image data. In one example, shown in FIG. 4, the computer 210 may be programmed to generate an intensity map 400 that substantially corresponds to an area of the zone 110, as discussed above. In one example, the computer 210 may be programmed to identify the zone 110 based on data received from a vehicle 180 location sensor 230, e.g., GPS sensor 230, and/or dead reckoning technique. Thus, the computer 210 may be programmed to identify the zone 110 boundaries based on received approximate location coordinates. For example, the GPS sensor 230 may have a predetermined inaccuracy of 50 meters, i.e., each of lateral and/or longitudinal coordinates determined by the GPS sensor 230 may be within 50 meters of an actual location coordinate of the vehicle 180. In one example, based on predetermined inaccuracy of location sensor 230 data, the computer 210 may be programmed to identify a zone 110 from the received grayscale image and to generate the second intensity map 400 based on the selected zone 110. Upon movement of the vehicle 180, an area included in the second intensity map 400 may change. The computer 210 may be programmed to generate iteratively, e.g., every 15 milliseconds (ms), a second intensity map 400 including the zone 110, e.g., a rectangular-shaped area with dimensions centered at the vehicle 180 estimated location, e.g., received from the vehicle 180 location sensor 230. In one example, the zone 110 may be 500×500 meters (m) area. The dimensions may be based on a predetermined inaccuracy, e.g., 50 m, of the vehicle 180 location sensor 230, e.g., 10 times the inaccuracy of the location sensor 230. Thus, even considering inaccurate data of vehicle 180 location sensor 230, dead reckoning, etc., still the vehicle 180 may be expected to be actually located within the zone 110.

The computer 210 can be programmed to generate, from the LIDAR data, a first intensity map 300 of an area around a vehicle, e.g., the zone 110, and may estimate a vehicle location based on comparing the first intensity map 300 to a grayscale satellite image, e.g., of an area 100 that at least encompasses the zone 110. The computer 210 may be programmed to generate a second intensity map 400, as shown in FIG. 4, based on the grayscale image, as shown in FIG. 1, and to estimate the vehicle 180 location based at least in part on the second intensity map 400.

The computer 210 may be programmed to compare the first intensity map 300 to the grayscale image by identifying a best match section 410e of the grayscale image. This identification can be made by comparing each of a plurality of regions (or sections) 410a-410i of the second intensity map 400 to the first intensity map 300. The computer 210 may be programmed to generate a second intensity map 400 that includes at least the zone 110. Sections 410a-410i shown in FIG. 4 are for illustration purposes; the zone 110 may be divided into any number of sections. In one example, dimensions of each section may be equal to dimensions of the first intensity map 300. In another example, as discussed below, the first intensity map 300 may sweep (or move on) the second intensity map 400 to identify a best match section. In the present context, "sweeping" or "moving" the first intensity map 300 means comparing, section by section, each section of the second intensity map 400 to the first intensity map 300 to identify best match section. A "section" of the intensity map 400 need not be predetermined or pre-specified, but rather can be determined to provide a section (or portion or area) of the map 400 suitable for a technique used to sweep the map 300 over the map 400. Thus, the first intensity map 300 may be moved by incremental longitudinal, lateral, and/or rotational steps to identify the best match section of the second intensity map 400.

In the present context, "best match" means having a maximum similarity or a minimum difference Diff between the first intensity map 300 and a respective section 410a-410i in the second intensity map 400. In one example, the computer 210 may be programmed to identify a best match section 410e upon determining based on operation (1) that a difference Diff between the first intensity map 300 and the section 410e in the second intensity map 400 is a minimum compared to a difference between the first intensity map 300 and any other area of the second intensity map 400.

$$\text{Diff} = \Sigma_{x=1}^{n} \Sigma_{y=1}^{m} I_2(x+x_0, y+y_0) - I_1(x,y) \quad (1)$$

The first intensity map 300 may have dimensions n and m. The parameters n, m represent the longitudinal and lateral dimensions of the first intensity map 300. Location coordinates x, y may represent coordinates in a Cartesian two-dimensional coordinates system. Location coordinates of pixels or cells in the first intensity map 300 may be based on a reference point in the first intensity map 300, e.g., a bottom left corner of the section 410e, thus the reference point may move as a result of vehicle 180 movement. However, a reference point of the second intensity map 400 may be a pixel or cell of the second intensity map 400 that is a fixed point on the ground surface. The location coordinates $x_0$, $y_0$ may present the location of the first intensity map 300 reference point relative to the reference point of the second intensity map 400. A parameter $I_2(x+x_0, y+y_0)$ represents an intensity of a pixel (or cell) of the second intensity map 400, whereas $I_1(x, y)$ represents an intensity of a pixel or cell of the first intensity map 300. Thus, x and y represent coordinates of a point in the coordinate system of the first intensity map 300. The computer 210 may be programmed to sweep the entire area of the second intensity map 400 by changing the coordinates of the reference point $x_0$, $y_0$ within the second intensity map 400. A sweep movement may include a combination of longitudinal, lateral, diagonal, and/or rotational movement of the first intensity map 300 over the second intensity map 400. For example, a longitudinal sweep may include moving the reference point $x_0$, $y_0$ to $x_0+10$ cm, $y_0$. A lateral sweep may include moving the reference point $x_0$, $y_0$ to $x_0$, $y_0+10$ cm. A diagonal sweep may include moving the reference point $x_0$, $y_0$ to $x_0+10$ cm, $y_0+10$ cm. Here it should be noted that FIG. 4, for convenience, shows the sections 410a-410i as not overlapping. Based on the above example of moving the reference point $x_0$, $y_0$ of the first intensity map 300 in small steps, e.g., 10 cm, it should be understood that the sections 410a-410i typically include overlapping portions. The computer 210 may be programmed to identify the best match section upon identifying a minimum difference Diff. Additionally or alternatively, the computer 210 may be programmed to identify the best match area of the second intensity map 400 using any other technique, e.g., correlation calculation techniques, etc. Additionally or alternatively, although not shown in FIG. 4, the computer 210 may be programmed to rotate the first intensity map 300 to identify the best match section. The first intensity map 300 is generated based on LIDAR data received from the vehicle 180 LIDAR sensor 230. Thus, an area included in the first intensity map 300 may change based on location, e.g., determined based on location sensor 230 data, dead reckoning, etc., and heading hd of the vehicle 180. A vehicle 180 heading hd is a two-dimensional vector that points to a current direction of the vehicle 180 movement. The vehicle 180 heading hd may be determined based on data received from vehicle 180 location sensor 230, and/or dead reckoning.

The computer 210 may be programmed to estimate, based on the identified best match section 410e, the vehicle location. The computer 210 may be programmed to determine the vehicle 180 location based on the best match region, e.g., the location coordinates $x_0$, $y_0$. In one example, the computer 210 may generate the first intensity map 300 such that the vehicle 180 is located at a center of the first intensity map 300. Thus, the computer 210 may be programmed to determine vehicle 180 location coordinates $x_0+n/2$, $y_0+m/2$ based on the identified location coordinates of best match region and predetermined dimensions n, m of the first intensity map 300.

With reference to FIG. 4, the vehicle heading hd changes based on vehicle 180 movements, e.g., on roads 130, etc. The computer 210 may be programmed to estimate, based on the identified best match section 410e, the vehicle location and a vehicle heading hd. In one example, the computer 210 may be programmed to determine the heading hd of the vehicle 180 based on the location coordinates $x_0$, $y_0$ and a rotation angle α of the first intensity map 300 to match the second intensity map 300. In one example, the computer 210 may be programmed to generate the first intensity map 300 such that the vehicle 180 has a 0 (zero) degree heading toward the reference point of the first intensity map 300. That may result from symmetrical data collection from the LIDAR sensor 230. In one example, in the first intensity map 300 a heading hd of the vehicle 180 may always be toward a specific direction because the map 300 is generated based on data received from the LIDAR sensor 230 that is mounted to the vehicle 180. The computer 210 may be programmed to determine a heading hd of 5 degrees upon determining that the first intensity map 300 is rotated 5 degrees to identify the best match to the second intensity map 400 (as discussed in detail with reference to FIGS. 5A-5C).

Figure 5A:
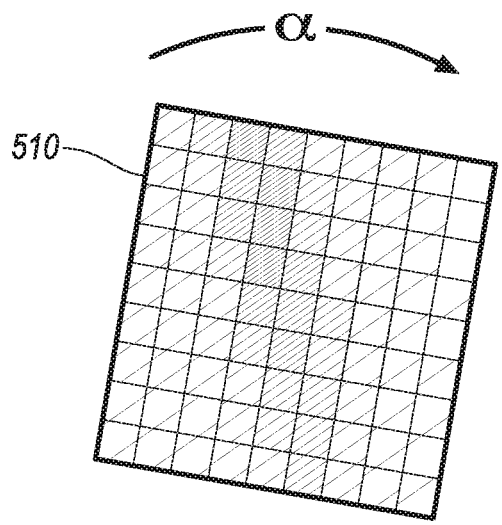
FIGS. 5A-5C show comparisons of the first intensity map rotated in the different directions relative to the second intensity map.
Figure 5B:
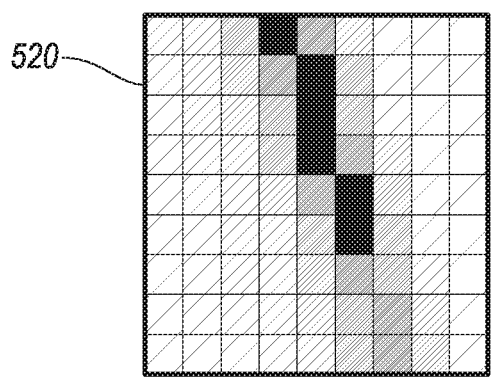
Figure 5C:
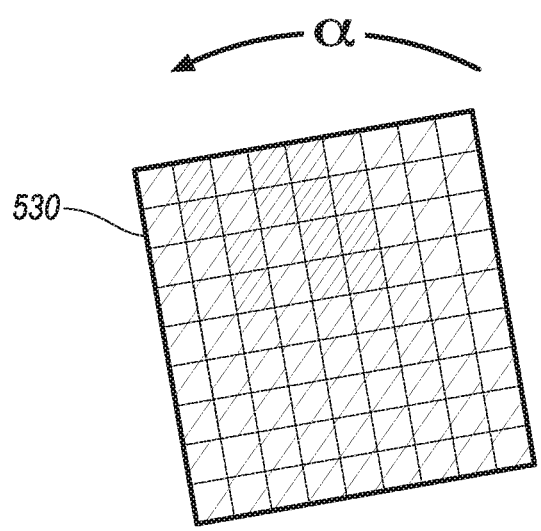

The computer 210 may be programmed to determine the vehicle 180 location based at in part on last determined location (also known as dead reckoning) and/or based in part on location data received from a vehicle 180 location sensor such as a general positioning system (GPS) sensor 230. The computer 210 may be programmed to generate multiple rotated first intensity maps 300, as shown in FIGS. 5A-5C, compared to a last vehicle 180 heading hd, and to determine the best match section based on comparing the rotated first intensity maps 300 to the second intensity map 400. Thus, the computer 210 may be programmed to estimate the vehicle 180 heading hd (as discussed in detail below) based on the determined best match section.

The computer 210 may be programmed to estimate the vehicle 180 location based on a last estimated vehicle 180 location, one or more physical attributes of the vehicle 180 including a vehicle 180 speed, a vehicle 180 heading hd, and an identified matched section of the second intensity map 400. In one example, with reference to FIGS. 5A-5C, the computer 210 may be programmed to generate a first intensity map (i.e., a same heading hd as a last determined heading hd of the vehicle 180), a right rotated first intensity map (a degrees to a right direction), and a left rotated first intensity map (a degrees in a left direction).

In one example, the computer 210 may be programmed to determine a rotation angle α based on a vehicle 180 physical attribute such as yaw rate, steering angle, speed, sampling rate of intensity map 300, etc. For example, with a sample rate of 15 ms for the intensity map 300 (i.e., receiving an updated first intensity map 300 every 15 ms), the computer 210 may be programmed to determine a possible change of heading a, e.g., 1 degree, within last 15 ms further based on vehicle 180 yaw rate, speed, etc.

FIGS. 5A-5C show comparison results 510, 520, 530 of the rotated intensity maps versus the second intensity map 400. The comparison results 510, 520, 530 show pixel-by-pixel comparison results of the first intensity map 300 to a respective compared section of second intensity map 400. In the present example, a darker shade indicates a less difference between the overlapped pixels of the rotated first intensity map 300 and the second intensity map 400. For example, with reference to FIGS. 5A-5B, the computer 210 may determine that the heading hd of the vehicle 180 is unchanged since last known location and/or heading hd, because the comparison 520 shows darker shade, or in other words the difference Diff value associated with comparison 520 is less than the determined differences Diff for right and left rotated comparisons 510, 530.

Additionally or alternatively, the computer 210 may be programmed to estimate the vehicle 180 location based on the intensity maps 300, 400 and physical attributes of the vehicle 180 based on an estimation algorithm such as a Kalman filter, average filter, particle filter, etc. Here is an example using a Kalman filter. The computer 210 may be programmed to estimate a first heading hd of the vehicle 180 based on the first intensity map 300 and the best matched section of the second intensity map 400, and to estimate the vehicle 180 heading hd based at least in part on the first heading hd and the one or more physical attributes of the vehicle 180.

The computer 210 may be programmed to estimate a state of the vehicle 180 including location longitudinal and lateral location coordinates X and Y, and the vehicle 180 heading hd. The state of the vehicle 180 may be represented with a 3×1 matrix [X, Y, H]. In the context of a Kalman filter technique, a Covariance P of the vehicle 180 state may be specified as a 3×3 matrix shown in operation (2).

$$P = \begin{bmatrix} xx & xy & xh \\ yx & yy & yh \\ hx & hy & hh \end{bmatrix} \quad (2)$$

The computer 210 may be programmed to predict a next state of the vehicle 180 using operations (3) and (4). Parameter K is an index which increases by one upon receiving a new first intensity map 300. A time dt between each two consecutively received intensity maps 300 may be constant, e.g., 15 ms. A state transition matrix F may be determined based on vehicle 180 dynamic model. The state transition matrix F may describe the relationship of variables and derivatives of the variables included in the state of the vehicle 180. In a simplified example, F may be an identity matric, i.e., a square matrix in which all the elements of a principal diagonal are ones and all other elements are zeros. An effect of multiplying a matrix by an identity matrix is to leave the respective matrix unchanged. A matrix Q represents a noise which may be determined based on vehicle 180 physical attributes. For example, matrix (5) shows an example set of values for Q.

$$X'_k = F_{k-1} X_{k-1} \quad (3)$$

$$P'_k = F_{k-1} P_{k-1} F_{Tk-1} + Q_{k-1} \quad (4)$$

$$Q = [4.376313e-02, 12.578877e-03, 4.443704e-03,\\ 2.000000e-03, 2.000000e-03, 2.000000e-03,\\ 9.999414e-01, 9.848537e-01, 5.887401e-03] \quad (5)$$

Now, turning to the results of the best match section, the computer 210 may be programmed to predict the state of the vehicle 180 further based on the best match section. In other words, the computer 210 may be programmed to improve a precision of vehicle 180 location determination by combining the best match result of intensity maps 300, 400 with the physical attributes of vehicle 180 and last known location and/or heading hd of the vehicle 180. The computer 210 may be programmed to determine the vehicle 180 location based on operations (6)-(8). In the present example, the matrix K is a Kalman gain matrix. The matrix H represents a mapping from sensor value, e.g., LIDAR sensor 230 data, to a state space, i.e., based on state [X, Y, H] described above. Matrix R represents sensor 230 noise. Typically, each sensor 230 generates noise included in the sensor 230 data. In the present example, the matrix R is a diagonal matrix. A diagonal matrix is a matrix having nonzero elements only in a matrix diagonal, i.e., from the upper left (first row first column) to the lower right (last row last column). Operation 9 shows an example matrix R used in the present context. Matrix Z is the estimated location of the vehicle 180 based on the first and second intensity maps 300, 400, i.e., the location estimated based on the identified best matched section, as discussed above.

$$K_k = P'_k H_{Tk} (H_k P'_k H_{Tk} + R_k)^{-1} \quad (6)$$

$$X_k = X'_k + K_k (Z_k + H_k X'_k) \quad (7)$$

$$P_k = (I - K_k H_k) P'_k (I - K_k H_k)_T + K_k R_k K_{Tk} \quad (8)$$

$$R = \begin{bmatrix} 0.25 & 0 & 0 \\ 0 & 0.25 & 0 \\ 0 & 0 & 0.25 \end{bmatrix} \quad (9)$$

Processing

Figure 6:
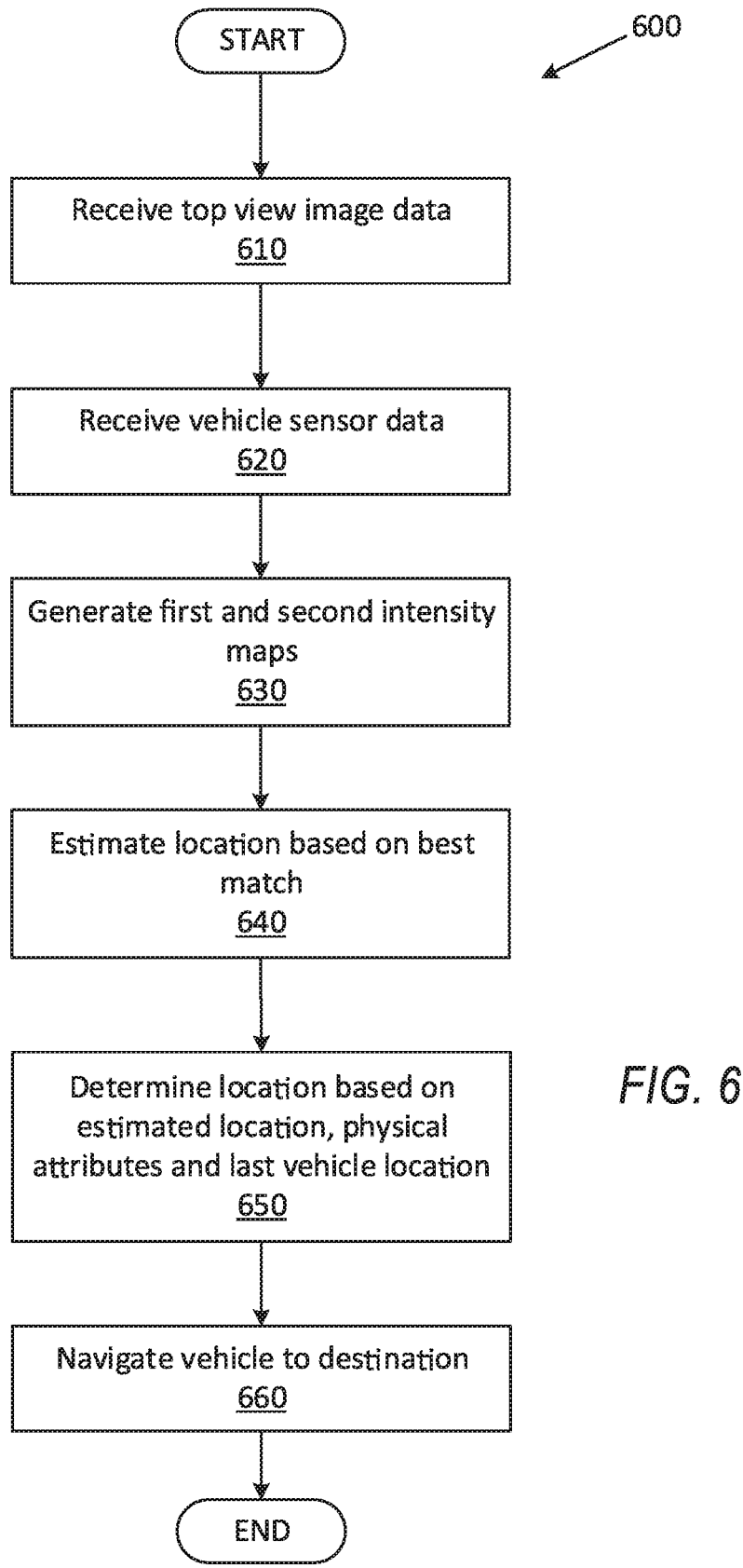
FIG. 6 is a flowchart of an exemplary process for determining a vehicle location and navigating the vehicle to a destination.

FIG. 6 is a flowchart of an exemplary process 600 for determining a vehicle 180 location and navigating the vehicle 180 to a destination. The vehicle 180 computer 210 may be programmed to execute blocks of the process 600.

The process 600 begins in a block 610, in which the computer 210 receives top view image data, e.g., satellite image data of an area 100 as shown in FIG. 1.

Next, in a block 620, the computer 210 receives vehicle 180 sensor 230 data. The computer 210 may be programmed to receive data from the LIDAR sensor 230. Additionally, the computer 210 may be programmed to receive vehicle 180 physical attributes such as a speed, acceleration, yaw rate, steering angle, etc. from the vehicle 180 sensors 230.

Next, in a block 630, the computer 210 generates a first intensity map 300 from the received LIDAR sensor 230 data and a second intensity map 400 from the received top view image data. The computer 210 may be programmed to generate, e.g., based on dead reckoning, the GPS sensor 230 data, etc., the second intensity map 400 that includes current vehicle 180 location.

Next, in a block 640, the computer 210 identifies a best match section in the second intensity map 400. The computer 210 may be programmed to identify, e.g., a best match section 410e within the second intensity map 400 that has a minimum difference Duff relative to the first intensity map 300. The computer 210 may be programmed to move the first intensity map 300 over the second intensity map 400 to identify a best match section 410e with a minimum difference Diff.

Next, in a block 650, the computer 210 estimates the vehicle 180 location based on the identified best match section 410e. The computer 210 may be programmed to estimate the vehicle 180 location based on the identified location coordinates $x_0$, $y_0$ and a predetermined location of the vehicle 180 relative to the reference point of the first intensity map 300, as discussed above.

As an example, the computer 210 may be programmed to determine the location using Kalman filter technique, as discussed above. Thus, the computer 210 may be programmed to determine location coordinates for the vehicle 180 that are more precise than the location coordinates estimates based on the best match section 416e.

Next, in a block 660, the computer 210 navigates the vehicle 180 by actuating the vehicle 180 propulsion, steering, and/or braking actuators 220. The computer 210 may be programmed to plan a vehicle 180 route based on the received destination data and the determined vehicle 180 location, e.g., output of the block 650. The computer 210 may be programmed to identify the route using known vehicle 180 navigation techniques.

Following the block 660, the process 600 ends, or alternatively returns to the block 610, although not shown in FIG. 6.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
    generate, from three-dimensional LIDAR data obtained from a vehicle LIDAR sensor, a first two-dimensional intensity map of an area around a vehicle;
    estimate a location of a vehicle based on comparing the first two-dimensional intensity map to a second two-dimensional intensity map generated from a grayscale top view image obtained from a sensor external to the vehicle; and
    operate the vehicle based on the estimated location.

2. The system of claim 1, wherein the instructions to compare the first two-dimensional intensity map to the grayscale image includes further instructions to identify a best match region of the grayscale image, by comparing each of a plurality of regions of the second two-dimensional intensity map to the first two-dimensional intensity map.

3. The system of claim 2, wherein the instructions include further instructions to estimate, based on the identified best match section, the vehicle location and a vehicle heading.

4. The system of claim 3, wherein the instructions to estimate the vehicle heading include further instructions to generate a plurality of rotated two-dimensional first intensity maps by rotating the first intensity two-dimensional map in a left and a right direction compared to a vehicle heading and determine the best match based on comparing the rotated first two-dimensional intensity maps to the second two-dimensional intensity map.

5. The system of claim 2, wherein the instructions to estimate the vehicle location include further instructions to:
  determine the plurality of sections based on an identified vehicle location;
  estimate a score of each section by comparing the respective section to the first two-dimensional intensity map; and
  identify the best match section by selecting the section with a maximum score.

6. The system of claim 1, wherein the instructions include further instructions to estimate the vehicle location based on an estimated vehicle location, one or more physical attributes of the vehicle including at least one of a vehicle speed and a vehicle heading, and an identified matched section of the second two-dimensional intensity map.

7. The system of claim 6, wherein the instructions include further instructions to:
  estimate a first vehicle heading based on the first intensity map and the best matched section of the second two-dimensional intensity map; and
  estimate the vehicle heading based at least in part on the first vehicle heading and the one or more physical attributes of the vehicle.

8. A method, comprising:
  generating, from three-dimensional LIDAR data obtained from a vehicle LIDAR sensor, a first two-dimensional intensity map of an area around a vehicle;
  estimating a location of a vehicle based on comparing the first two-dimensional intensity map to a second two-dimensional intensity map generated fam a grayscale top view image obtained from a sensor external to the vehicle; and
  operating the vehicle based on the estimated location.

9. The method of claim 8, wherein comparing the first two-dimensional intensity map to the grayscale image further comprises identifying a best match region of the grayscale image, by comparing each of a plurality of regions of the second two-dimensional intensity map to the first two-dimensional intensity map.

10. The method of claim 9, further comprising estimating, based on the identified best match section, the vehicle location and a vehicle heading.

11. The method of claim 10, wherein estimating the vehicle heading further comprises:
  generating a plurality of rotated first two-dimensional intensity maps by rotating the first two-dimensional intensity map in a left and a right direction compared to a vehicle heading; and
  determining the best match based on comparing the rotated first intensity maps to the second two-dimensional intensity map.

12. The method of claim 9, wherein estimating the vehicle location further comprises:
  determining the plurality of sections based on an identified vehicle location;
  estimating a score of each section by comparing the respective section to the first two-dimensional intensity map; and
  identifying the bet match section by selecting the section with a maximum score.

13. The method of claim 8, further comprising estimating the vehicle location based on an estimated vehicle location, one or more physical attributes of the vehicle including at least one of a vehicle speed and a vehicle heading, and an identified matched section of the second two-dimensional intensity map.

14. A system, comprising:
  a LIDAR sensor for a vehicle; and
  a processor and a memory, the memory storing instructions executable by the processor to:
  generate, from three-dimensional LIDAR data obtained from the LIDAR sensor, a first two-dimensional intensity map of an area around the vehicle;
  receive, from a remote computer, a grayscale top view image captured by a sensor external to the vehicle;
  estimate a location of the vehicle based on comparing the first two-dimensional intensity map to a second two-dimensional intensity map generated from the grayscale top view image; and
  operate the vehicle based on the estimated location.

15. The system of claim 14, wherein the instructions to compare the first two-dimensional intensity map to the grayscale image includes further instructions to identify a best match region of the grayscale image, by comparing each of a plurality of regions of the second two-dimensional intensity map to the first two-dimensional intensity map.

16. The system of claim 15, wherein the instructions include further instructions to estimate, based on the identified best match section, the vehicle location and a vehicle heading.

17. The system of claim 16, wherein the instructions to estimate the vehicle heading include further instructions to generate a plurality of rotated two-dimensional first intensity maps by rotating the first intensity two-dimensional map in a left and a right direction compared to a vehicle heading and determine the best match based on comparing the rotated first two-dimensional intensity maps to the second two-dimensional intensity map.

18. The system of claim 15, wherein the instructions to estimate the vehicle location include further instructions to:
  determine the plurality of sections based on an identified vehicle location;
  estimate a score of each section by comparing the respective section to the first two-dimensional intensity map; and
  identify the best match section by selecting the section with a maximum score.

19. The system of claim 14, wherein the instructions include further instructions to estimate the vehicle location based on an estimated vehicle location, one or more physical attributes of the vehicle including at least one of a vehicle speed and a vehicle heading, and an identified matched section of the second two-dimensional intensity map.

20. The system of claim 19, wherein the instructions include further instructions to:
  estimate a first vehicle heading based on the first intensity map and the best matched section of the second two-dimensional intensity map; and estimate the vehicle heading based at least in part on the first vehicle heading and the one or more physical attributes of the vehicle.

\* \* \* \* \*

UNITED STATES PATENT AND TRADEMARK OFFICE
CERTIFICATE OF CORRECTION

PATENT NO. : 11,237,269 B2  
APPLICATION NO. : 15/963383  
DATED : February 1, 2022  
INVENTOR(S) : Ankit Girish Vora et al.

Page 1 of 1

It is certified that error appears in the above-identified patent and that said Letters Patent is hereby corrected as shown below:

In the Claims

Claim 8, Column 13, Line 45:  
Replace "generated fam a grayscale" with "--generated from a grayscale--"

Claim 12, Column 14, Line 8:  
Replace "identifying the bet match" with "--identifying the best match--"

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*